United States Patent [19]

Wagner

[11] Patent Number: 4,633,760

[45] Date of Patent: Jan. 6, 1987

[54] VACUUM-OPERATED POWER BRAKE BOOSTER HAVING TWO-PART COAXIAL CONTROL VALVE HOUSING

[75] Inventor: Wilfried Wagner, Hattersheim, Fed. Rep. of Germany

[73] Assignee: ITT Industries, Inc., New York, N.Y.

[21] Appl. No.: 613,596

[22] Filed: May 23, 1984

[30] Foreign Application Priority Data

May 24, 1983 [DE] Fed. Rep. of Germany ....... 3318744
Jul. 28, 1983 [DE] Fed. Rep. of Germany ....... 3327223

[51] Int. Cl.$^4$ .................... F15B 9/10; F16K 31/00
[52] U.S. Cl. .................... 91/369 A; 91/376 R; 251/367
[58] Field of Search ............ 60/547.1; 403/155, 326; 91/369 A, 376 R; 92/13.2; 251/323, 367

[56] References Cited

U.S. PATENT DOCUMENTS

| | | | |
|---|---|---|---|
| 3,312,147 | 4/1967 | Reichard | 60/547.1 X |
| 3,410,178 | 11/1968 | Kytta | 91/369 |
| 4,192,220 | 3/1980 | Tateoka | 403/155 X |
| 4,227,371 | 10/1980 | Takeuchi | 60/547.1 |
| 4,400,942 | 8/1983 | Reinartz et al. | 60/547.1 |
| 4,409,885 | 10/1983 | Reinartz et al. | 91/369 A X |
| 4,425,760 | 1/1984 | Furuta | 60/547.1 |

FOREIGN PATENT DOCUMENTS

| | | | |
|---|---|---|---|
| 1655991 | 7/1982 | Fed. Rep. of Germany | 91/369 A |
| 54-156982 | 12/1979 | Japan | 91/369 A |
| 2070167A | 9/1981 | United Kingdom | 60/547.1 |

Primary Examiner—Robert E. Garrett
Assistant Examiner—George Kapsalas
Attorney, Agent, or Firm—James B. Raden; Donald J. Breh

[57] ABSTRACT

In a vacuum-operated power brake booster, a control housing with a poppet valve for the control of the differential pressure comprises two control housing parts slidable telescopically in relation to one another. The first control housing part is secured to the rolling diaphragm through a diaphragm plate. In the release position the diaphragm plate is in abutment on the frontal sealing surface of the poppet valve that is held by the first control housing part. On its side remote from the sealing surface, the poppet valve is furnished with a stop which bears against the second control housing part through a sleeve. The second control housing is held by the booster housing via a ring seal. To keep the effect of the atmospheric pressure on the outwardly disposed surfaces of the poppet valve as small as possible, the poppet valve is provided on its section remote from the sealing surface with a circumferential annular sealing lip which projects radially outwardly beyond the said section and which is in sealing abutment on the cylindrical inner surface of the second control housing part.

10 Claims, 5 Drawing Figures

VACUUM-OPERATED POWER BRAKE BOOSTER HAVING TWO-PART COAXIAL CONTROL VALVE HOUSING

BACKGROUND OF THE INVENTION

The present invention relates to a vacuum-operated power brake booster comprising a booster piston that is sealed in relation to the vacuum booster housing by a rolling diaphragm. The booster comprises a piston rod coupled to a brake pedal for the actuation of a double valve. By means of the valve a working chamber of the power brake booster is alternatively connectible to vacuum or to higher differential pressure. A first valve is formed by a valve seat at the booster piston and by a poppet valve preloaded in the direction of the valve seat, while a second valve is formed by the same poppet valve and by a valve piston connected with the piston rod.

A vacuum booster as shown in German printed and published patent application No. 29 42 416, comprises a booster piston which subdivides the interior of a booster housing into a first working chamber, that is inwardly connected to a vacuum source, and into a second working chamber. A valve cylinder projects from the back side of the booster piston and contains at its front side a first annular valve seat, with a valve piston being slidably arranged in the valve cylinder. The valve piston carries a second annular valve seat which is encompassed by the first valve seat and is coupled to a driving rod. The valve cylinder also contains a valve member which is urged by a preload member against the first and the second valve seat. The first and the second working chamber will establish communication through a gap between the first valve seat and the valve member upon retraction of the valve piston. Upon advance movement of the valve piston, the second working chamber will be connected with the atmosphere via a clearance between the second valve seat and the valve member. Between the booster housing and the driving rod in this vacuum booster is a stop which confines the travel of retraction of the driving rod such that the clearance between the first valve seat and the valve member in the inactive position of the driving rod is smaller than this clearance is when the driving rod is to be retracted.

This known vacuum-operated power brake booster bears the disadvantage that, although the lost travel can be reduced until response of the device, it cannot be eliminated, since the tolerances of the individual components constituting the control influence the lost travel with a view to preventing leakage of the device. Likewise in other comparable known power brake boosters, special arrangements make the valve piston approach the control housing sealing seat by about the "response lost travel".

SUMMARY OF THE INVENTION

It is an object of the present invention to provide a power brake booster of the type generally described wherein upon actuation of the brake an output force will be generated instantaneously and without lost travel, while improvement of both the response time and the release time is enhanced. The assembly of the power brake booster is constructed with straightforward design of the individual structural components. Finally, the power brake booster is constructed with a compact design, while the master cylinder may be mounted at least partially into the housing of the brake unit.

This object is accomplished in the present invention in that the rolling diaphragm abutting on the diaphragm plate which is coupled to the booster piston is in operative connection with a first control housing part. The first control housing part is guided at a second control housing part. A spring washer retained by the second control housing part engages in an indentation in the first control housing part, to limit the movability of the two control housing parts relative to one another.

Preferably, the second control housing part is of sleeve-like design and embraces the first control housing part at least partially, with the portion of the second control housing that embraces the first control housing part containing radially extending slots through which the legs of the spring washer penetrate.

Preferably, the valve piston cooperating with the poppet valve is held and guided in the first control housing part. There is spring action provided in the control housing longitudinal direction bearing both against the first valve portion and against the valve piston and closing the second valve in the brake release position, with the valve seat moving into abutment on the sealing surface of the poppet valve. The control housing part that cooperates with the booster piston forms a first valve in the area of its end face adjacent to the piston rod in combination with the sealing surface of the poppet valve, while a channel terminates at the control housing part radially outside the sealing seat. This channel connects the annular chamber in the valve housing part with the compartment communicating with the vacuum source.

In a preferred embodiment, the second control housing part comprises a radially outwardly extending collar which coacts with a ring seal that is held at the booster housing part and sealingly encloses the cylindrical outer surface of the second booster housing.

To achieve a proper sealing, the generally sleeve-like second control housing part comprises a radially inwardly extending bead, in the area of its mid-portion bearing against which is the poppet valve with its end close to the piston rod. A spring is clamped in between this bead and the collar of the poppet valve to comprise a sealing surface with the spring urging the sealing surface of the poppet valve against the first control housing.

With a view to ensuring a reliable seat of the spring washer, the spring washer held by the second control housing part is of generally U-shaped design and has two resilient legs whose free ends contain radially inwardly bent-off tongues which latter encompass a bead at the first control housing part.

The second control housing part contains on its outer surface a circumferential groove into which the spring washer is inserted, the two legs of the spring washer projecting radially inwardly through slots in the wall of the second control housing part and forming a stop, against which the annular lateral wall of the bead abuts, when the valve is opened. The displaceability of the two control housing parts in relation to one another are guaranteed by the fact that the second control housing part is held by the booster housing part. The second control housing part is telescopically slidable over the end of the first control housing part close to the piston rod. A seal is provided in the area of the guiding surface between the two control housing parts, the seal acting to prevent the escape of pressure fluid from the working chamber into the annular chamber radially outside the sealing surface of the poppet valve.

In a preferred embodiment, the annular poppet valve comprises at its section remote from the sealing surface a circumferential collar which projects radially outwardly beyond the last section. The collar comprises an annular sealing lip which, when mounted, abuts sealingly on the inner surface of the second control housing part, while the poppet valve itself is embraced and held at its annular surface at the last section by the first control housing part.

In the release position, of this embodiment, the first control housing part bears via the valve sealing seat against the sealing surface of the poppet valve. The poppet valve contains a stop on its side remote from the sealing surface, which stop is, in turn, enclosed by a ring seal directly or by the intermediary of a sleeve whose radially outwardly protruding tabs abut on corresponding cams at the second control housing part. The ring seal is held by the booster housing part, while the two valves are closed so that, upon actuation of the piston rod, the second valve lifts without lost motion.

BRIEF DESCRIPTION OF THE DRAWINGS

The present invention is capable of a plurality of embodiments, one of which is described in more detail with reference to the accompanying drawings, in which.

DETAILED DESCRIPTION

Figures 1, 2:
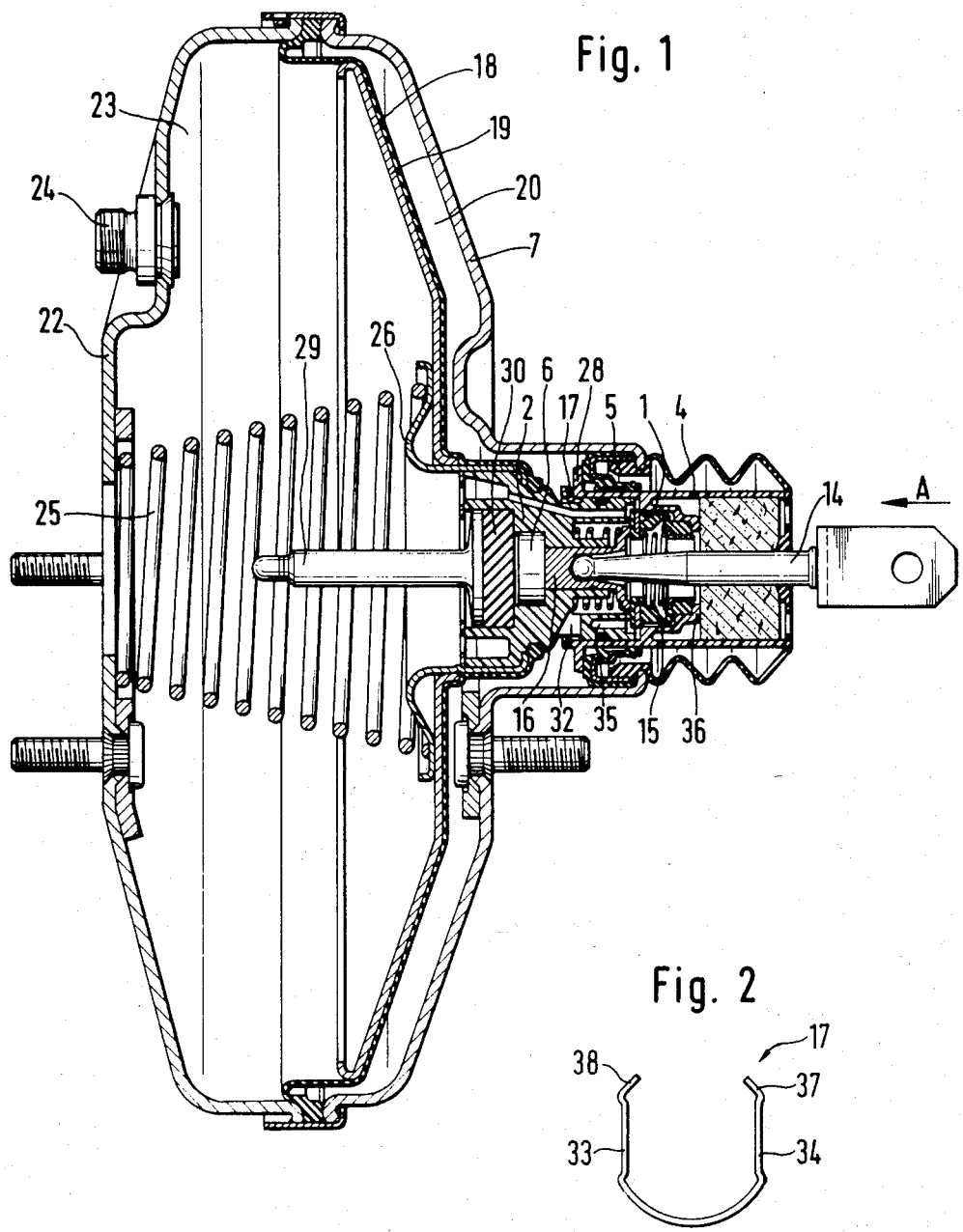
FIG. 1 shows a longitudinal cross-section through a vacuum-operated power brake booster using the invention.
FIG. 2 shows a plan view of the spring washer as shown in FIG. 1.

As shown in FIG. 1, the power brake booster is substantially comprised of a bipartite booster housing 7 and 22, a rolling diaphragm 18 subdividing the housing interior into the compartments 20 and 23, a diaphragm plate 19, a vacuum port 24, a spring 25 cooperating with the master cylinder (not illustrated in detail), two control housing parts 2 and 4, a poppet valve 1, a valve piston 16, a rubber reaction disc 30, a piston rod 14 and a push rod 29.

The frusto-conic compression spring 25 urges the diaphragm plate 19 with the first control housing part 2 via the sealing seat 12 against the poppet valve 1 and the sealing surface 11, respectively. The spring also urges the plate 19 toward the booster housing part 7 through its support on the first control housing part 2 via the flange 26.

Figure 3:
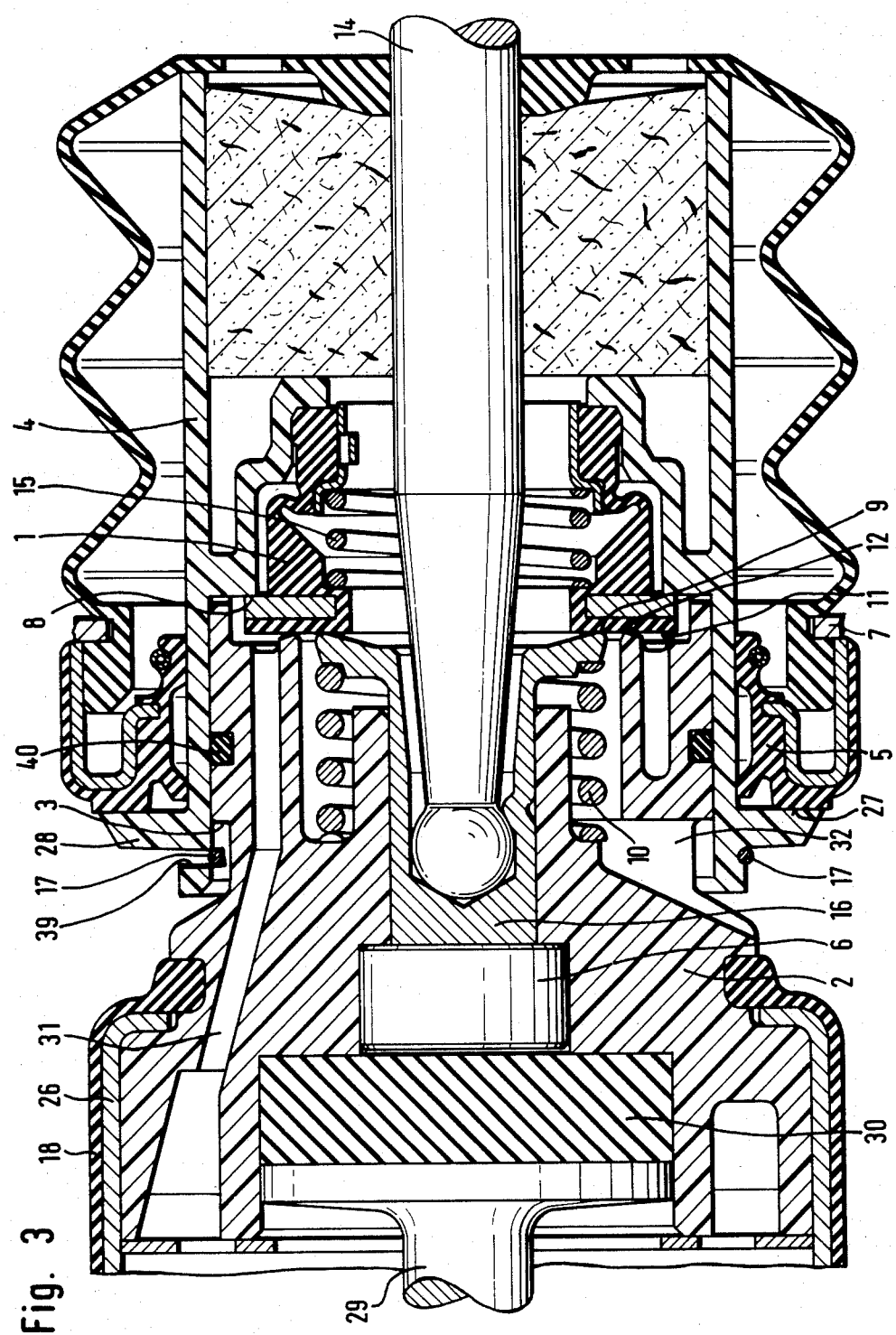
FIG. 3 shows a longitudinal cross-section of the control housing assembly of FIG. 1 on an enlarged scale.

As seen best in FIG. 3, on the side remote from the sealing surface 11, the poppet valve 1 has a stop surface 8 which abuts on a stop member portion 63 of a radially inwardly directed stopped tubular wall 63 of the control housing part 4 in the brake release position. A collar 64 on the sleeve 63 supports the end of the poppet valve through a compression spring 15. The control housing part 4, in turn, bears preferably against the ring seal 5 and thus adopts as its normal position, a rear position. In this position, a sealing seat 9 at the valve piston 16 as well as a sealing seat 12 of the control housing part 2 of the bipartite control housing 2 and 4 are both urged against the sealing surface 11 of the poppet valve 1. As a result, the valve piston sealing seat 9 is able to lift immediately upon actuation of the piston rod 14, and the booster responds without lost motion.

Upon actuation of the piston rod 14, the first control housing part 2 advances until the stop 3 strikes a wall of the second control housing part 4. Thus, the sliding surface for the ring seal 5 is correspondingly short. The two control housing parts 2 and 4 are sealed in relation to one another preferably by an O-ring 40.

The valve piston 16 is not rigidly connected to the disc 6 which serves as the adjustment of the booster transmission, since the stop 3 limits the travel of the valve piston 16 in the valve opening position. By telescopically joining the two control housing parts 2 and 4, the guide length of the unit is enhanced, and buckling or jamming of the control housing parts 2 and 4 is prevented thereby.

The two control housing parts 2 and 4 perform a relative movement, upon the response of the booster and in the event of the booster having re-assumed its rear or normal release position. During all other functions, the two control housing parts 2 and 4 remain stationary in relation to one another.

Since the spring 25 and the piston-rod return spring 10 both are supported on the poppet valve 1 via the sealing surface 11 in the release position, the sealing seats 9 and 12 are preferably designed such that, after approximately 0.2 mm deformation of the elastomeric material such as rubber, a comparatively large surface will be engaged as the stop abutment to avoid damage to the material. The limitation of the relative motion of the two control housing parts at the stop 3 is taken care of by a spring washer 17 which is assembled on to the second control part 4 sideways. As shown in FIG. 2, the spring washer 17 is of a u-shaped configuration including two resilient legs 33, 34 which each include at their free ends a radially inwardly bent-off tongue or finger 37, 38.

In the release position, the collar 28 of second control housing part 4 abuts against stop 27 of ring seal 5, the ring seal being pressed into the booster housing part 7, while the stops of poppet valve 1 abuts against the sealing seat 12. The sealing seat 9 of the valve piston 16 is urged by the spring 10 against the poppet valve sealing surface 11, while the sealing seat 12 of the control housing part 2 is urged by the spring 25 via the flange 26 against the sealing surface 11 of the poppet valve 1. In the released position in which the two control housing parts 2 and 4 are illustrated in the drawing, a pressure balance prevails in the compartments 20 and 23.

Upon actuation, the piston rod 14 is caused to move in the direction of the arrow A so that the valve piston sealing seat 9 lifts from the poppet valve sealing surface 11 and atmospheric pressure flows into the compartment 20 through the gap between the sealing seat and surface. The corresponding pressure difference between the compartments 20 and 23 results in generation of a force which pushes the first control housing part 2 to the left in FIG. 1 in the direction of the master cylinder (not illustrated). The reaction force for the boosting effect is transmitted via a rubber reaction disc 30 onto the piston rod 14.

The control housing sealing seat 12 is maintained seal-tight in the first phase of motion by the sealing surface 11 of the poppet valve 1 which follows the control housing part 2, due to the spring 15 taking support via the control housing sealing seat 12 until the sealing seats 12 and 9 assume the breather position.

First, the control housing 4 will remain stationary upon actuation, until spring washer 17 is reached and moved via a stop 3. After this relative movement, the spring 15 will retain the two control housing parts 2 and 4 in this position.

During release, the force on the piston rod 14 in the direction of arrow A is removed, thus enabling the spring 10 to urge the valve piston 16 with sealing seat 9 back until the control housing sealing seat 12 opens. The opening travel is limited by the stop 3 of the two control housing parts 2 and 4. The atmospheric pressure can then be sucked out from the compartment 20 via the channels 31 and 32. The control housing sealing seat remains opened until the booster has returned to its initial position and the control housing part 4 abuts with its collar 28 on the stop 27 and the control housing sealing seat 12 is urged backwards by the spring 25. In this arrangement, the two control housing parts 2 and 4 slide telescopically into one another, and the stop 3 will be released so that the booster will now be in its release position.

Figure 4:
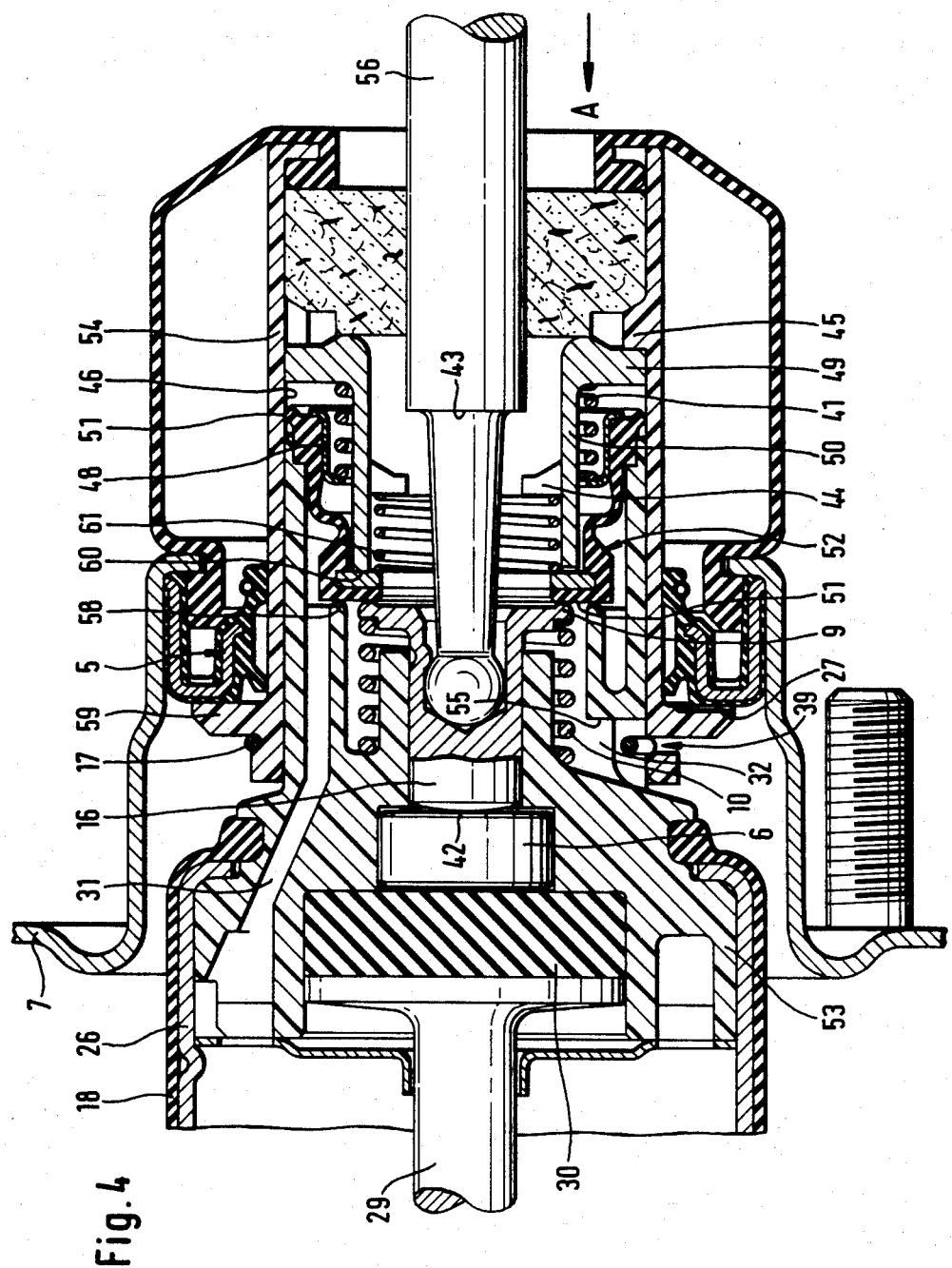
FIG. 4 shows a variant embodiment of another control housing assembly in cross-section on an enlarged scale.

In the embodiment of the power brake booster shown in FIG. 4, the spring 25 urges the diaphragm plate 19 with the first control housing part 53 through its sealing seat 58 against the poppet valve 52 and its sealing surface 57, respectively, and urges the plate 19 via the second control housing part 54 against the booster housing part 7, due to the spring 25 being supported on the first control housing part 53 via the flange 26.

On the side remote from the sealing surface 57, the poppet valve 52 has a stop 60 which abuts via collar 49 on the sleeve 50 against the stop 45 on the control housing part 54 in the release position. The control housing part 54, in turn, bears against the ring seal 5 and thus adopts a terminal rear position. In this position, the sealing seat 9 at the valve piston 16 as well as the sealing seat 58 in the control housing part 53 of the bipartite control housing 53 and 54 are urged against the sealing surface 57 of the poppet valve 52. As a result, the valve piston sealing seat 9 is able to lift immediately upon actuation of the piston rod 56, and the booster responds without lost motion.

Upon actuation of the piston rod 56, the first control housing part 53 advances until the stop 55 reaches and advances the second control housing part 54. Hence, the sliding surface for the ring seal 5 is correspondingly short. The two control housing parts 53 and 54 are sealed in relation to one another by the sealing edge 51 of the poppet valve 52.

The valve piston 16 is not rigidly connected to the disc 6 which allows adjustment of the booster transmission, since the stop 55 limits the opening travel of the valve piston 16. By telescopically joining the two control housing parts 53 and 54, the guide length is enhanced, and buckling or jamming of the control housing parts 53 and 54 is prevented thereby.

The two control housing parts 53 and 54 perform a relative movement i.e., upon the response of the booster and in the event of the booster having re-assumed its rear position. During all other functions, the two control housing parts 53 and 54 remain stationary relative to one another.

Since the spring 25 and the piston-rod return spring 10 are supported on the poppet valve 52 via the sealing surface 57 in the release position, the sealing seats 9 and 58 are preferably designed such that, after approximately 0.2 mm deformation of the elastomeric material, a comparatively large surface will be engaged as an abutment to avoid damage to the material. The limitation of the relative motion of the two control housing parts 53 and 54 at the stop 55 is controlled by a spring washer 17 which is slid on sideways.

In the release position, the collar 59 of the second control housing part 54 abuts at the ring seal 5 with stop 27, the ring seal being pressed into the booster housing part 7, while the poppet valve 52 abuts the stop 60 via the sleeve 50 in the control housing part 54. The sealing seat 9 of the valve piston 16 is urged by the spring 10 to bear against the poppet valve sealing surface 57, while the sealing seat 58 of the control housing part 53 is urged by the spring 25 to bear via the flange 26 against the sealing surface 57 of the poppet valve 52. In the position in which the two control housing parts 53 and 54 are illustrated in FIGS. 1 and 4, pressure balance prevails in the compartments 20 and 23.

Upon actuation, the piston rod 56 is caused to move in the direction of the arrow A so that the valve piston sealing seat 9 lifts from the poppet valve sealing surface 57 and atmospheric pressure flows into the compartment 20. The ensuing pressure difference between the compartments 20 and 23 results in generation of a force which pushes the first control housing part 53 in the direction of the master cylinder (not illustrated). The reaction force for the boosting effect is transmitted via a rubber reaction disc 30 onto the piston rod 56. The spring 61 is supported on one end by the collar 49 of the sleeve 50 and by the stop surface 60 of the poppet valve.

The control housing sealing seat 58 is maintained seal-tight in the first phase of motion by the sealing surface 57 of the poppet valve 52 which follows the control housing part 53, due to the spring 61 being supported on the control housing sealing seat 58 until the sealing seats 58 and 9 assume the so-termed breather position.

First, the control housing 54 will remain stationary upon actuation, until it is reached and moved by a spring washer 17 via a stop 55. After this relative movement, the spring 41 assisted by the spring 61 will retain the two control housing parts 53 and 54 in this relative position.

During release, the force at the piston rod 56 will be removed, thus enabling the spring 10 to urge the valve piston 16 with sealing seat 9 back until the control housing sealing seat 58 opens. The opening travel is limited by the stop 55 of the two control housing parts 53 and 54. The atmospheric pressure can than be sucked out of compartment 20 via the channels 31 and 32. The control housing sealing seat remains open, until the booster has returned to its initial position and the control housing part 54 abuts with its collar 59 on the stop 27 and the control housing sealing seat 58 is urged backwards by the spring 25. In this arrangement, the two control housing parts 53 and 54 slide into one another, and the stop 55 will be released so that the booster will now be in its release position.

At its end remote from the piston rod 56, the valve piston 16 comprises crowned end surface 42 by which its abuts the disc 6, as a result whereof the disc 6 is prevented from being jammed in its guide in the control housing part 53.

During assembly, the piston rod 56 in conjunction with the sleeve 50, the poppet valve 52, the valve piston 16 and the springs 41 and 61 are slid into the control housing part 53, while the bead 43 is supported on the tabs 44 which extend from the sleeve 50 radially inwardly, so that, via the piston rod 56, the sleeve 50 with poppet valve 52 and springs 41 and 61 can be slid in by force. In the final stage of the assembly, the control housing part 54 is slid onto the control housing part 53, while the cams 45 disposed at the control housing part 54 bear against the sleeve 50 and keep the springs 41 and 61 in bias. Finally, the two control housing parts 53 and 54 are locked in relation to one another by virtue of the spring washer 17.

It is a special advantage of the poppet valve 52 that the valve can be held and guided at the first control housing part 53, while its annular sealing edge 51 is in sealing abutment on the cylindrical inner wall 46 of the second control housing part 54 so that there is no need for any additional ring seal to seal the two control housing parts 53 and 54 relative to each other.

Figure 5:
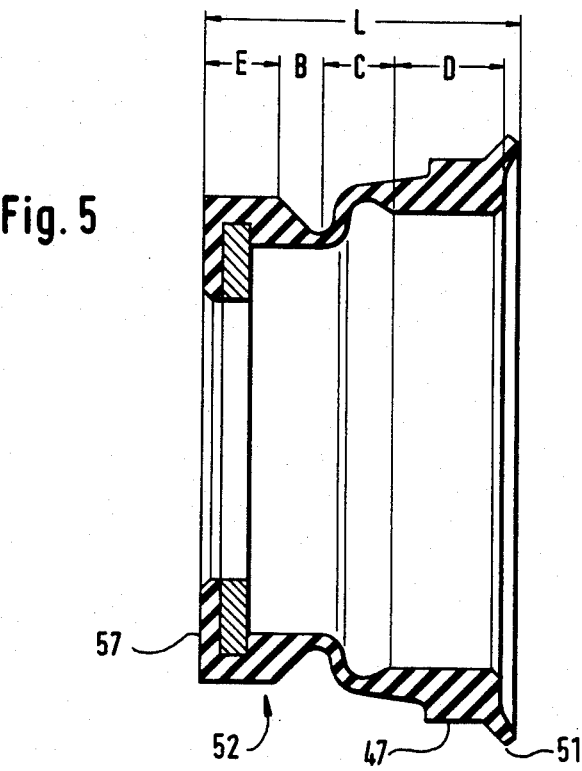
FIG. 5 shows the poppet valve of the control housing assembly of FIG. 4 in cross-section on the same scale as in FIG. 4.

The poppet valve 52 as shown in FIG. 5 contains four sections E, B, C, D, the section E forming at its end surface the sealing surface 57 which coacts both with the sealing edge 9 of the valve piston 16 and with the sealing edge 58 of the first control housing part 53. Section D disposed diametrally opposite section E and forming the other end of the poppet valve 52 has a generally rectangular cross-sectional surface, an annular collar or sealing lip 51 projecting radially outwardly which, when the poppet valve 52 is built in, abuts sealingly on the cylindrical inner surface 46 of the second control housing part 54. With its radially outwardly disposed cylindrical sealing surface 47, this section D of the poppet valve 52 bears tightly against the first control housing part 53 through a special clamping flange 48 (FIG. 4), which serves to support the spring 41, and also abuts the inner surface of the section D and urges this part of the poppet valve 52 tightly against its seat at the first control housing part 53. The sections B and C form together a pleated bellows so that the overall length L of the poppet valve 52 is variable responsive to forces in an axial direction.

To the end that the force acting due to the atmospheric pressure on the rear part of the control housing part 54 is kept as small as possible, the sealing of the poppet valve 52 in relation to the control housing part 54 is shifted radially farther outwardly and is taken care of there by a sealing lip 51. The poppet valve 52 itself is sealingly accommodated at the first control housing part 53. Owing to this arrangement, the atmospheric force becomes very small and can be compensated for entirely by the spring 41.

What is claimed is:

1. A vacuum-operated power brake booster comprising, a booster housing, a rolling diaphragm dividing said housing into a working compartment and a low-pressure compartment, a piston rod coupled to a brake pedal for actuation of a double valve between a brake released position and a fully braked position, the working compartment of the power brake booster being alternatively connectible to vacuum or to a higher differential pressure by said double valve, said double valve including a first valve defined by a first valve seat on a first control housing part and a sealing surface on one side of an annular portion of one end of a poppet valve, a second valve is defined by said sealing surface on said poppet valve and a second valve seat on a valve piston connected to said piston rod, said poppet valve preloaded in a direction toward said fully braked position, the rolling diaphragm abuts a diaphragm plate coupled to the first control housing part, wherein said first control housing part is received in and guided by a second control housing part for relative slidable movement therein, and wherein a spring washer on the second control housing part is received in an indentation in the first control housing part at a predetermined spaced distance from a stop surface on said first housing part when in the released position, the stop surface on said first housing part adapted to engage said spring washer to limit the relative movement of the first control housing part relative to said second control housing part from said released position toward said fully braked position to said predetermined distance, in the release position the first valve seat on said first control valve housing part and the second valve seat on said valve piston being in abutment on the sealing surface of the poppet valve, a second stop surface on said poppet valve on said annular portion opposite said sealing surface, said second stop surface in the release position being in abutment against a stop member on the second control housing part, and a ring seal affixed to said housing and sealingly engaging an external sliding surface of said second control housing part.

2. A vacuum-operated power brake booster as claimed in claim 1, in which the second control housing part is of sleeve-shaped design a portion of which embraces at least partially the first control housing part, and in which there are at least two radially extending slots in the portion of the second control housing part embracing the first control housing part, through which slots legs of the spring washer project.

3. A vacuum-operated power brake booster as claimed in claim 1, in which the valve piston is held and guided in first control housing part, and a spring is supported on one end on the first control housing part and on a second end on the valve piston, said spring biases said second valve seat against said sealing surface to close the second valve in the brake release position.

4. A vacuum-operated power brake booster as claimed in claim 1, in which the second control housing part includes a radially outwardly extending flange which sealingly compressively engages said ring seal on said housing part.

5. A vacuum-operated power brake booster as claimed in claim 1, in which the spring washer held by the second control housing part is of generally U-shaped design and includes two resilient legs each having a free end defining radially inwardly bent-off fingers which embrace a bead at the first control housing part.

6. A vacuum-operated power brake booster as claimed in claim 1, wherein said second control housing part is generally sleeve shaped and includes a tubular sleeve disposed coaxially internally therein, said tubular sleeve having a radially outwardly directed collar at one end affixed to the internal surface of said second control housing part and an end opposite said one end thereof defining said stop member in abutment with said second stop surface of said poppet valve.

7. A vacuum-operated power brake booster as claimed in claim 6, wherein said tubular sleeve within said second control housing part includes internal radial tab means supporting one end of a compression spring, a second end of said compression spring supported against said second stop surface on said poppet valve whereby said sealing surface is biased toward said first and said second valve seats.

8. A vacuum-operated power brake booster as claimed in claim 6, wherein a second end of said poppet valve opposite said one end thereof is sealingly compressed against an end of said first control housing part disposed internally of said second control housing part by a second compression spring between said collar on said tubular sleeve and said poppet valve second end, and said second end of said poppet valve includes a sliding lip seal engaging the inner surface of said second control housing part.

9. A vacuum-operated power brake booster as claimed in claim 1, wherein said second control housing part is generally sleeve shaped and includes a stepped-shaped tubular sleeve disposed coaxially internally therein, said stepped sleeve having a radially outwardly directed collar at one end affixed to the internal surface of said second control housing part defining said stop member in abutment with said second stop surface on said poppet valve and a radially inwardly directed collar against which a second end of said poppet valve is supported.

10. A vacuum-operated power brake booster as claimed in claim 9 further including a compression spring between said second end of said poppet valve at said second stop surface of said poppet valve whereby said sealing surface is biased toward said first and said second valve seats.

* * * * *